(12) United States Patent
Yu et al.

(10) Patent No.: US 10,774,456 B2
(45) Date of Patent: Sep. 15, 2020

(54) LAUNDRY PROCESSING APPARATUS

(71) Applicant: LG ELECTRONICS INC., Seoul (KR)

(72) Inventors: Insik Yu, Seoul (KR); Youngjong Kim, Seoul (KR); Youngjun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 265 days.

(21) Appl. No.: 15/558,719

(22) PCT Filed: Mar. 15, 2016

(86) PCT No.: PCT/KR2016/002557
§ 371 (c)(1),
(2) Date: Sep. 15, 2017

(87) PCT Pub. No.: WO2016/148479
PCT Pub. Date: Sep. 22, 2016

(65) Prior Publication Data
US 2018/0066390 A1  Mar. 8, 2018

(30) Foreign Application Priority Data

Mar. 16, 2015  (KR) .................. 10-2015-0036042
Mar. 16, 2015  (KR) .................. 10-2015-0036043

(51) Int. Cl.
*D06F 37/20* (2006.01)
*D06F 37/24* (2006.01)
(Continued)

(52) U.S. Cl.
CPC .............. *D06F 37/24* (2013.01); *D06F 34/28* (2020.02); *D06F 37/20* (2013.01); *D06F 37/40* (2013.01);
(Continued)

(58) Field of Classification Search
CPC .......... D06F 37/20; D06F 37/24; D06F 37/40; D06F 39/005; D06F 39/14; F16F 1/36; F16F 9/19; F16F 9/54; F16F 2230/0052
(Continued)

(56) References Cited

U.S. PATENT DOCUMENTS

2015/0020548 A1*  1/2015  Yu ........................... D06F 37/24
68/23.2

FOREIGN PATENT DOCUMENTS

KR   20-1992-0006395 U   4/1992
KR   20-1995-0023334 U   8/1995
(Continued)

*Primary Examiner* — Levon J Shahinian
(74) *Attorney, Agent, or Firm* — Dentons US LLP

(57) ABSTRACT

A laundry processing apparatus according to the present invention comprises: a cabinet; a tub, arranged in the interior of the cabinet, for storing laundry water; longitudinal dampers connecting the cabinet and tub and supported on supporting ends on the tub, and supporting the tub as same hangs from the cabinet; upper guide pins fixed to the upper parts of the cabinet and extending vertically with respect to the supporting ends; upper transverse dampers, connecting the upper guide pins and tub and vertically movable along the upper guide pins, for reducing the horizontal vibration for the tub; lower guide pins fixed to the lower parts of the cabinet and extending vertically with respect to the supporting ends; and lower transverse dampers, connecting the lower guide pins and tub and vertically movable along the lower guide pins, for reducing the horizontal vibration for the tub. The laundry processing apparatus according to the present invention has the effect of reducing the horizontal vibration for the tub by means of the transverse dampers arranged on the upper and lower parts, with respect to the supporting ends, to connect the cabinet and tub.

16 Claims, 20 Drawing Sheets

(51) Int. Cl.
  *D06F 37/40* (2006.01)
  *D06F 39/00* (2020.01)
  *D06F 39/14* (2006.01)
  *F16F 1/36* (2006.01)
  *F16F 9/19* (2006.01)
  *F16F 9/54* (2006.01)
  *D06F 34/28* (2020.01)

(52) U.S. Cl.
  CPC ............... *D06F 39/14* (2013.01); *F16F 1/36* (2013.01); *F16F 9/19* (2013.01); *F16F 9/54* (2013.01); *F16F 2230/0052* (2013.01)

(58) Field of Classification Search
  USPC .................................................. 68/23.1, 23.2
  See application file for complete search history.

(56) References Cited

FOREIGN PATENT DOCUMENTS

| | | |
|---|---|---|
| KR | 20-1996-0017666 U | 6/1996 |
| KR | 10-0195454 B1 | 6/1999 |
| KR | 10-2015-0011215 A | 1/2015 |

\* cited by examiner

LAUNDRY PROCESSING APPARATUS

This application is a National Stage Entry of International Application No. PCT/KR2016/002557, filed Mar. 15, 2016, and claims the benefit of Korean Application Nos. 10-2015-0036042, filed on Mar. 16, 2015 and 10-2015-0036043, filed on Mar. 16, 2015, all of which are hereby incorporated by reference for all purposes as if fully set forth herein.

TECHNICAL FIELD

The present invention relates to a laundry processing apparatus for reducing the horizontal vibration of a tub.

BACKGROUND ART

In general, a laundry processing apparatus is an apparatus for processing laundry by applying physical and chemical activities to the laundry. A washing machine for removing contaminants included in laundry, a dehydrator for dehydrating the laundry by rotating a washing tub including the laundry at high speed, and a dryer for drying wet laundry by applying cool wind or hot wind into a washing tube is referred as a laundry processing apparatus.

The laundry processing apparatus includes a tub received as same hangs inside a cabinet by a vertical suspension and a drum rotated in the tub to receive laundry (or clothes). The washing machine further includes a pulsator (laundry wing) rotated in the drum.

Since the laundry processing apparatus rotates a drum or a pulsator, vibration occurs. A general laundry processing apparatus includes a device for buffering vibration of the tub.

The vertical suspension according to the related art performs a function for reducing the vertical vibration of the tub.

However, the vertical suspension can buffer only the vertical vibration occurring from the tub but cannot efficiently reduce the horizontal vibration.

In particular, in recent years, in order to improve utility of a residential space, researches and studies have been actively carried out to maximize capability of the tube while maintaining the whole size of the laundry processing apparatus. Accordingly, a gap between the cabinet and the tub is gradually reduced.

However, since collision possibility between the tub and the cabinet is increased when the gap between the cabinet and the tub is reduced, the horizontal vibration of the tub should be efficiently reduced.

DISCLOSURE

Technical Problem

An embodiment of the present invention provides a laundry processing apparatus for efficiently reducing the horizontal vibration of a tub.

Technical Solution

There is provided a laundry processing apparatus including: a cabinet; a tub, arranged in the interior of the cabinet, for storing laundry water; longitudinal dampers connecting the cabinet and tub and supported on supporting ends on the tub, and supporting the tub as same hangs from the cabinet; upper guide pins fixed to the upper parts of the cabinet and extending vertically with respect to the supporting ends; upper transverse dampers, connecting the upper guide pins and tub and vertically movable along the upper guide pins, for reducing the horizontal vibration for the tub; lower guide pins fixed to the lower parts of the cabinet and extending vertically with respect to the supporting ends; and lower transverse dampers, connecting the lower guide pins and tub and vertically movable along the lower guide pins, for reducing the horizontal vibration for the tub.

There is provided a laundry processing apparatus including: a cabinet comprising a cabinet base placed on a ground; a cabinet body coupled with an edge of the cabinet case to form a lateral surface; and a top cover coupled with an upper part of the cabinet body and including an upper part formed therein with an introduction hole so that laundry is vertically introduced; a tub, arranged in the interior of the cabinet, for storing laundry water; longitudinal dampers connecting the cabinet and tub and supported on supporting ends on the tub, and supporting the tub as same hangs from the cabinet; a guide pin including a top end fixed to the top cover and a bottom end fixed to the cabinet base; an upper transverse damper located at an upper part of the supporting end, connecting the guide pin and the tub, vertically moved along the guide pin, for reducing the horizontal vibration of the tub; and a lower transverse damper located at a lower part of the supporting end, connecting the guide pin and the tub, vertically moved along the guide pin, for reducing the horizontal vibration of the tub.

There is provided a laundry processing apparatus including: a cabinet; a tub, arranged in the interior of the cabinet, for storing laundry water; longitudinal dampers connecting the cabinet and tub and supported on supporting ends on the tub, and supporting the tub as same hangs from the cabinet; an upper transverse damper located at an upper part of the supporting end, connecting the longitudinal damper and the tub, vertically moved along the longitudinal damper, for reducing the horizontal vibration of the tub; a lower guide pin fixed to the cabinet and vertically extending long; and a lower transverse damper located at a lower part of the supporting end, connecting the guide pin and the tub, vertically moved along the guide pin, for reducing the horizontal vibration of the tub.

There is provided a laundry processing apparatus including: a cabinet comprising a cabinet base placed on a ground; a cabinet body coupled with an edge of the cabinet case to form a lateral surface; and a top cover coupled with an upper part of the cabinet body and including an upper part formed therein with an introduction hole so that laundry is vertically introduced; a tub, arranged in the interior of the cabinet, for storing laundry water; longitudinal dampers connecting the cabinet and tub and supported on supporting ends on the tub, and supporting the tub as same hangs from the cabinet; a guide pin including a top end fixed to the cabinet body and a bottom end fixed to the cabinet base; an upper transverse damper located at an upper part of the supporting end, connecting the guide pin and the tub, vertically moved along the guide pin, for reducing the horizontal vibration of the tub; and a lower transverse damper located at a lower part of the supporting end, connecting the guide pin and the tub, vertically moved along the guide pin, for reducing the horizontal vibration of the tub.

There is provided a laundry processing apparatus including: a cabinet comprising a cabinet base placed on a ground; a cabinet body coupled with an edge of the cabinet case to form a lateral surface; and a top cover coupled with an upper part of the cabinet body and including an upper part formed therein with an introduction hole so that laundry is vertically introduced; a tub, arranged in the interior of the cabinet, for storing laundry water; longitudinal dampers connecting the cabinet and tub and supported on supporting ends on the tub, and supporting the tub as same hangs from the cabinet; a guide pin including a top end and a bottom end fixed to the cabinet body; an upper transverse damper located at an upper part of the supporting end, connecting the guide pin and the tub, vertically moved along the guide pin, for reducing the horizontal vibration of the tub; and a lower transverse damper located at a lower part of the supporting end, connecting the guide pin and the tub, vertically moved along the guide pin, for reducing the horizontal vibration of the tub.

The above information disclosed in this background section is only for enhancement of understanding of the background of the invention and therefore it may contain information that does not form the prior art that is already known in this country to a person of ordinary skill in the art.

Advantageous Effects

The present invention has following one or more effects.

First, a laundry processing apparatus according to the present invention reduces the horizontal vibration of the tub through a transverse damper connecting the cabinet and the tub.

Second, a laundry processing apparatus according to the present invention efficiently reduces the vertical vibration of the tub through an upper transverse damper located at an upper part of a supporting end and a lower transverse damper located at a lower part of a supporting end.

Third, since at least one of the upper transverse damper or the lower transverse damper may move vertically in a laundry processing apparatus according to the present invention, the horizontal vibration is reduced while efficiently avoiding stress concentration due to the vertical vibration.

Fourth, in a laundry processing apparatus according to the present invention, since a guide pin is installed in at least one of an inner side or an outer side of the transverse damper and the transverse damper may move relative to the guide pin, the vibration occurring from the tube is efficiently removed.

Effects of the present invention may not be limited to the above and other objects and other objects which are not described may be clearly comprehended to those of skill in the art to which the embodiment pertains through the following description.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the. In some instances, known structures and devices are omitted, or are shown in block diagram form focusing on important features of the structures and devices, so as not to obscure the concept of the present invention.

Hereinafter, a top load washing machine is described as an example of a laundry processing apparatus, but the present invention is not limited to the washing machine.

Figure 1:
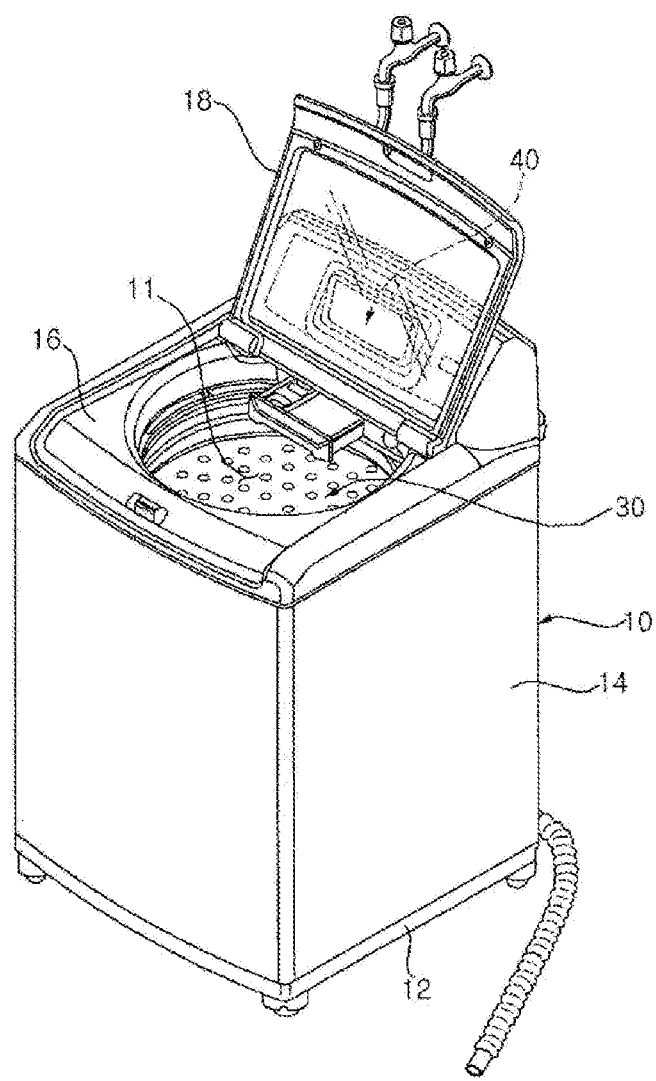
FIG. 1 is a perspective view illustrating a top load washing machine according to a first embodiment of the present invention.
Figure 2:
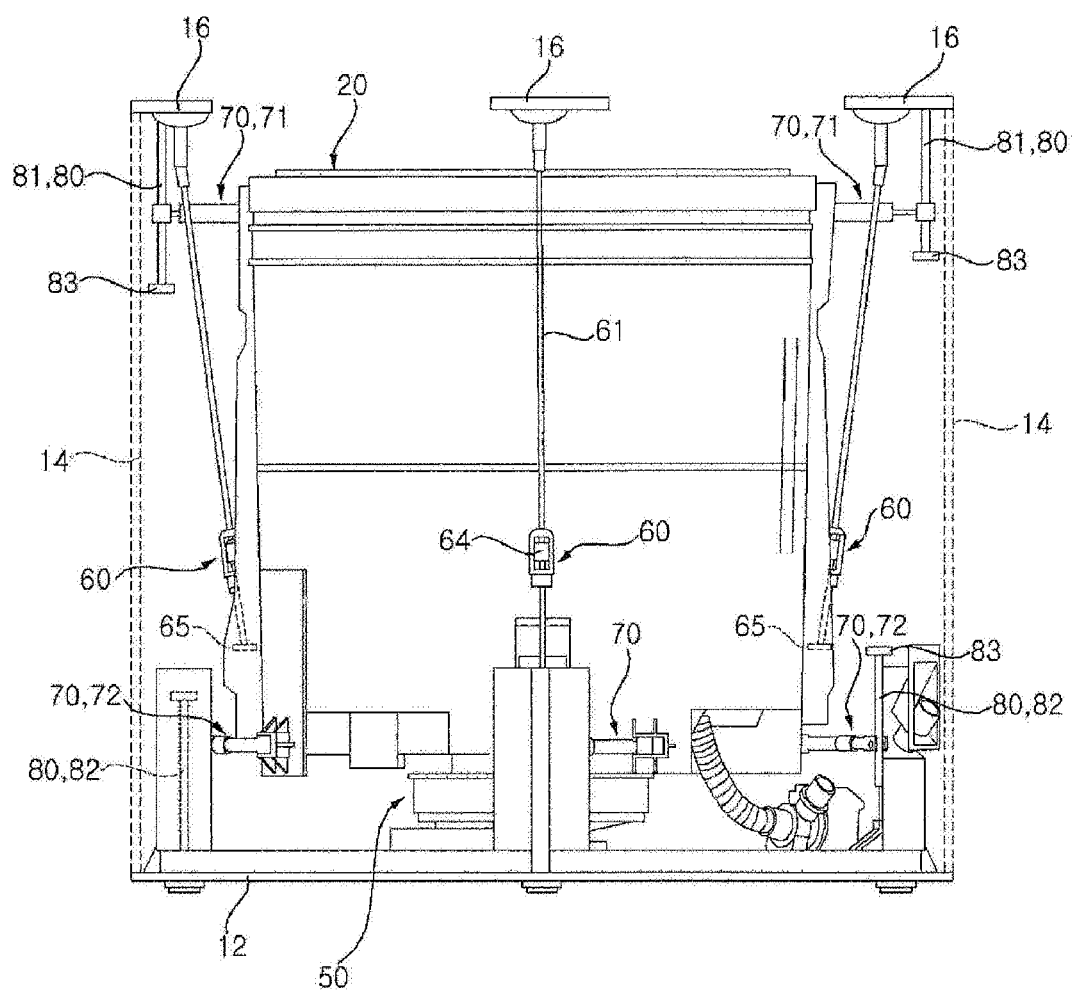
FIG. 2 is a front view illustrating an inside of a top load washing machine shown in FIG. 1.
Figure 3:
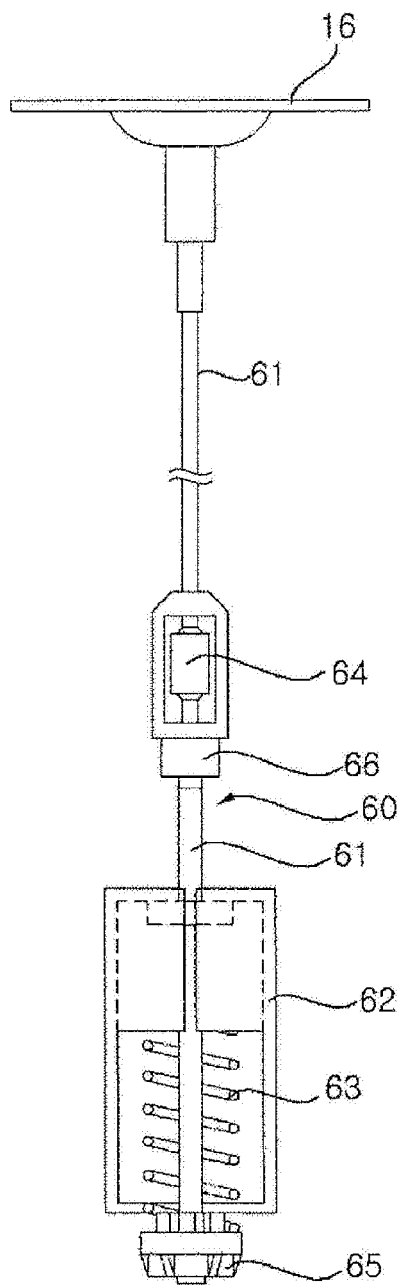
FIG. 3 is a front view illustrating a longitudinal damper shown in FIG. 2.
Figure 4:
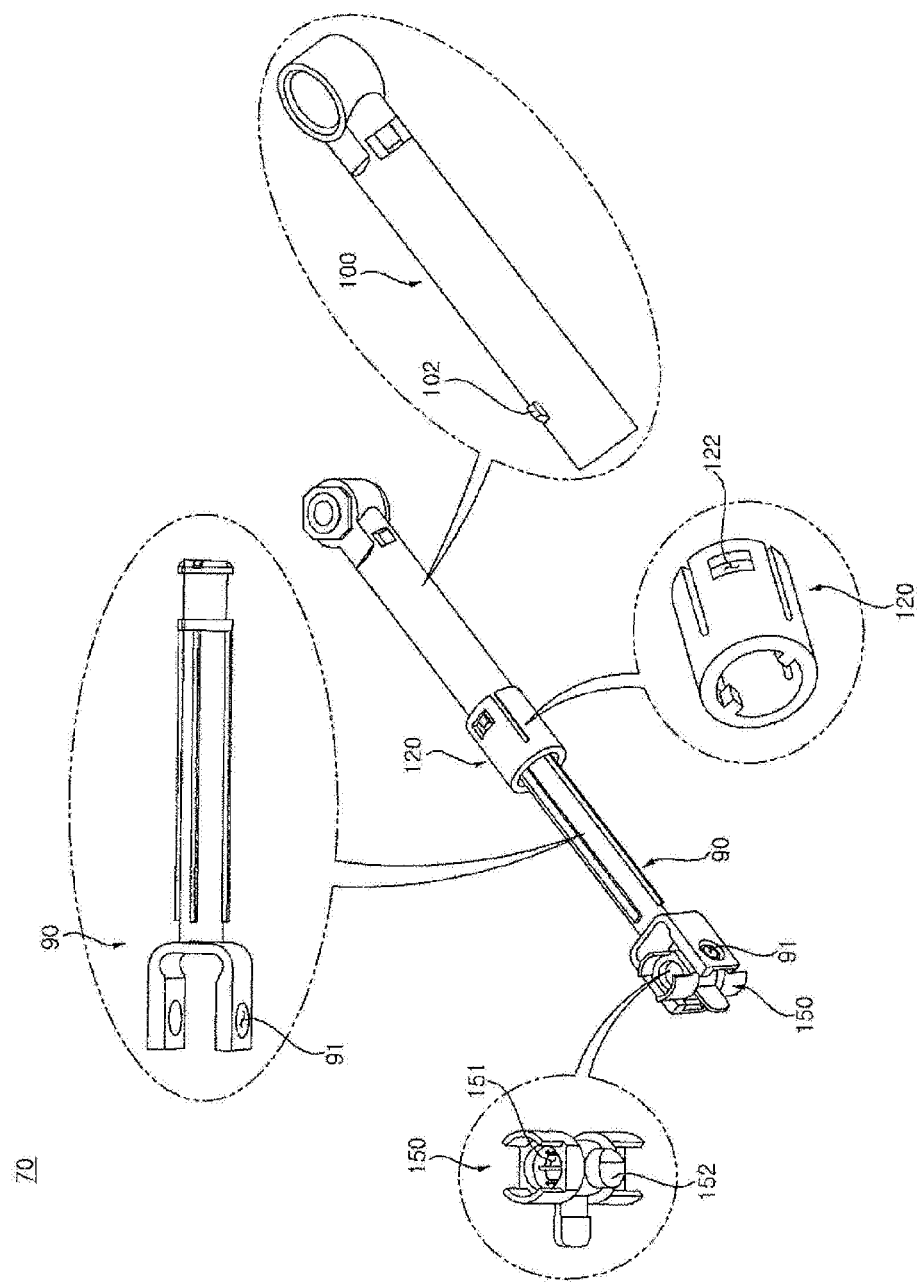
FIG. 4 is a perspective view illustrating a transverse damper shown in FIG. 2.

FIG. 1 is a perspective view illustrating a top load washing machine according to a first embodiment of the present invention, FIG. 2 is a front view illustrating an inside of a top load washing machine shown in FIG. 1, FIG. 3 is a front view illustrating a longitudinal damper shown in FIG. 2, and FIG. 4 is a perspective view illustrating a transverse damper shown in FIG. 2.

A washing machine according to the present embodiment includes a cabinet 10 configured to form an outer appearance; a tub 20 arranged in the interior of the cabinet, for storing laundry water; a drum 30 arranged inside the tub 20 in which the laundry water is loaded so that laundry is performed in the drum 30; a drive module 50 mounted in the tub to rotate the drum 30; longitudinal dampers 60 supporting the tub 20 as same hangs from the cabinet 10; and transverse dampers 70 coupled with the tub 20, for reducing the horizontal vibration for the tub 20.

The cabinet 10 includes a cabinet base 12 placed on the ground; a cabinet body 14 coupled with a peripheral region of the cabinet base 12 to form a lateral surface; a top cover 16 coupled with a upper part of the cabinet body 14 and including a upper part formed therein with an introduction hole 11; and a door 18 installed at the top cover 16 to open/close the introduction hole 11.

The door 13 is arranged therein with a transparent window so that an inside of the door 13 may be observed through the transparent window.

A control module 40 is installed at the top cover 16 so that a user may select a laundry mode and an operation state of the washing machine may be reported to the user.

The tub 20 is arranged in the interior of the cabinet 10.

The drum 30 is installed inside the cabinet 10.

Laundry water is stored in the tub 20 and the drum 30 is partially sunk by the stored laundry water.

A pulsator (not shown) is installed inside the drum 30.

The pulsator is located at a lower side inside the drum 30.

The drive module 50 is installed at a lower side outside of the tub 20.

The drive module 50 includes a drive shaft. The drive shaft is connected to the drum 30 and the pulsator through the tub 20.

At least one of the drum 30 or the pulsator may be driven by operating the drive shaft.

The drive module 50 may selectively drive at least one of the drum 30 or the pulsator, which is a general technology known to those skilled in the art.

The tub 20 is supported by the longitudinal dampers 60 as same hangs from the cabinet 10.

It shall be interpreted that the longitudinal damper 60 mainly buffers vertical vibration but shall not be interpreted that the longitudinal damper 60 buffers only the vertical vibration.

The longitudinal damper 60 is inclined to mainly reduce the vertical vibration during vibration occurring from the tub 20.

A top end of the longitudinal damper 60 is hung at the cabinet 10 and a bottom end of the longitudinal damper 60 is coupled with the tub 20.

The longitudinal damper 60 includes a support rod 61 configured to connect the tub 20 with the cabinet 10; a slider 62 installed at the support rod 61 and integrally moved with the tub 20 along the support rod 61; a damper spring 63 configured to elastically support the slider 62; a supporting end 65 installed at a bottom end of the support rod 61 to support the damper spring 63; and a friction part installed at the support rod 61, moved along the support rod 61, and moving together with the slider 62 during excessive vibration of the tub 2 to provide friction force to the slider 62.

A plurality of longitudinal dampers 60 are arranged around the tub 20. In the present embodiment, four longitudinal dampers are arranged.

In the present embodiment, a top end of the support rod 61 is coupled with a top cover 16 of the cabinet 10. Unlike the present embodiment, the support rod 61 may be coupled at a certain part of the cabinet 10.

The top end of the support rod 61 is hung at the top cover 16 to be pivotally moved. The support rod 61 may perform tuning movement while being hung at the top cover 16.

The supporting end 65 is fixed to a bottom end of the support rod 61. The damper spring 63 is supported at the supporting end 65.

The slider 62 is integrally moved with the tub 20. The slider 62 is moved along the support rod 61.

The damper spring 63 is arranged between the supporting end 65 and the slider 62 and provides elastic force to the slider 62.

The tub 20 is put on the damper spring 63 to be elastically supported.

A friction part housing 66 is installed at the support rod 61 and the friction part 64 is installed inside the friction part housing 66.

When the vibration of the tub 20 is in a normal vibration state of a predetermined level or less, friction due to the friction part 64 is not generated. When the vibration of the tub 20 is in an excessive vibration state greater than the predetermined level, the friction due to the friction part 64 is generated.

In a case of the normal vibration state, a buffer operation due to the damper spring 63 and attenuation due to the slider 62 are achieved.

In a case of the excessive vibration state, a combination attenuation of a buffer operation of the damper spring 63, attenuation of the slider 62, and friction force of the friction part 64 is applied.

That is, in an excessive vibration state exceeding a buffer range of the damper spring 63, the slider 62 pushes and moves the friction part housing 66 to operate the friction part 64.

The transverse damper 70 buffers the horizontal vibration during vibration occurring from the tub 20. The above means that the transverse damper 70 mainly buffers the horizontal vibration but shall not be interpreted that the transverse damper 70 buffers only the horizontal vibration.

In the present embodiment, the transverse damper 70 connects the cabinet 10 to the tub 20.

The transverse dampers 70 are disposed at an upper part and a lower part of the tub 20, respectively.

Further, a plurality of transverse dampers 70 is circumferentially disposed at the tub 20.

In the present embodiment, four transverse dampers 70 are disposed at the same interval at the upper part of the tub 20. In addition, four transverse dampers 70 are disposed at the same interval at the lower part of the tub 20.

In order to assemble the transverse dampers 70, guide pins 80 are disposed at a upper part and a lower part of the cabinet 10, respectively.

For convenience of description, a reference numeral of an upper transverse damper is defined as 71 and a reference numeral of a lower transverse damper is defined as 72.

The transverse damper 70 may buffer transverse vibration at the same height. When the tub 20 vertically vibrates, the transverse damper 70 may vertically move along the guide pin 80 to buffer the transverse vibration.

Only one guide pin 80 may be disposed. In the present embodiment, the guide pin 80 includes an upper guide pin 81 coupled with the upper transverse damper 71 and a lower guide pin 82 coupled with the lower transverse damper 72.

In the present embodiment, the upper guide pin 81 extends downward from the top cover 16.

In the present embodiment, the lower guide pin 82 extends upward from the cabinet base 12.

A guide stopper 83 is disposed at a bottom end of the upper guide pin 81 and prevents the transverse damper 70 from being separated. A guide stopper 83 is disposed at a top end of the lower guide pin 82 and prevents the transverse damper 70 from being separated.

Unlike the present embodiment, friction parts 64 are disposed at the upper guide pin 81 and the lower guide pin 82, respectively, to suppress separation of the transverse damper 70.

Although only the guide pin 80 is shown for description in the present embodiment, a separate support structure (not shown) may be installed in order to support vibration of the tub 20.

In the present embodiment, the guide pin 80 is coupled with the top cover 16 or the cabinet base 12 to be supported, and is not directly connected with the cabinet body 14.

Unlike the present embodiment, when the cabinet body 14 is a firm structure, the guide pin 80 may be coupled with the cabinet body 14.

The transverse damper 70 includes a first connection member 90 coupled with one of the cabinet 10 or the tub 20; a second connection member 100 inserted into the interior of the first connection member 90 to relatively move, and coupled with the other of the cabinet 10 or the tub 20; and a damper holder 150 coupled with an end of the first connection member 90 and an end of the second connection member 100 and rotated relative to the first connection member 90 or the second connection member 100.

In the present embodiment, the first connection member 90 is configured in the form of a piston, and the second connection member 100 is configured in the form of a cylinder.

The fluid is filled inside the second connection member 100 used as the cylinder, and provides a damping force during relative motion with the first connection member 90.

The damper holder 150 may be installed in at least one of an end of the first connection member 90 or an end of the second connection member 100, and may be installed at both of them.

In the present embodiment, a damper holder 150 is installed at the second connection member 90 coupled with the guide pin 80.

The damper holder 150 includes a guide hole 151 in which the guide pin 80 is inserted and a holder shaft 152 coupled with the first connection member 90 to be rotated.

The damper holder 150 may vertically move along the guide pin 80.

In this case, the damper holder 150 may be rotated based on the holder shaft 152. The damper holder 150 may be rotated at an angle formed due to relative motion of the transverse damper 70.

The first connection member 90 is formed therein with a holder shaft hole 91 in which the holder shaft 152 is inserted.

The damper holder 150 connects the guide pin 80 and the first connection member 90 to cross each other.

Further, a limiting member 120 for limiting a moving distance of the first connection member 90 may be installed at the second connection member 100. The limiting member 120 is locked to a coupling protrusion 102 which is formed at the second connection member 100. The limiting member 120 is coupled with a side of the second connection member 100 in which the first connection member 90 is inserted.

The piston stopper 120 prevents the first connection member 90 from being separated from the second connection member 100.

The limiting member 120 is formed therein with a coupling hole 122 in which the coupling protrusion 102 is inserted.

Figure 5:
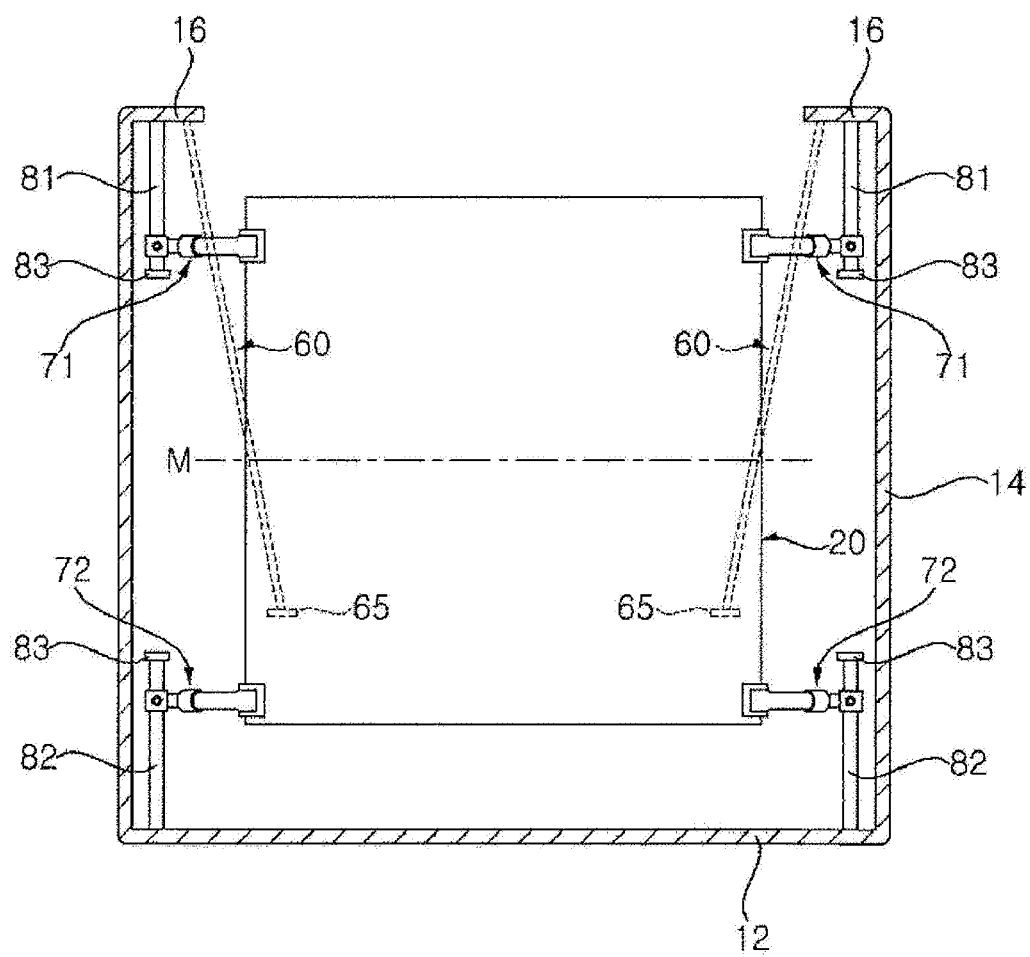
FIG. 5 is a front view schematically illustrating arrangement of a transverse damper in a top load washing machine according to a first embodiment of the present invention.
Figure 6:
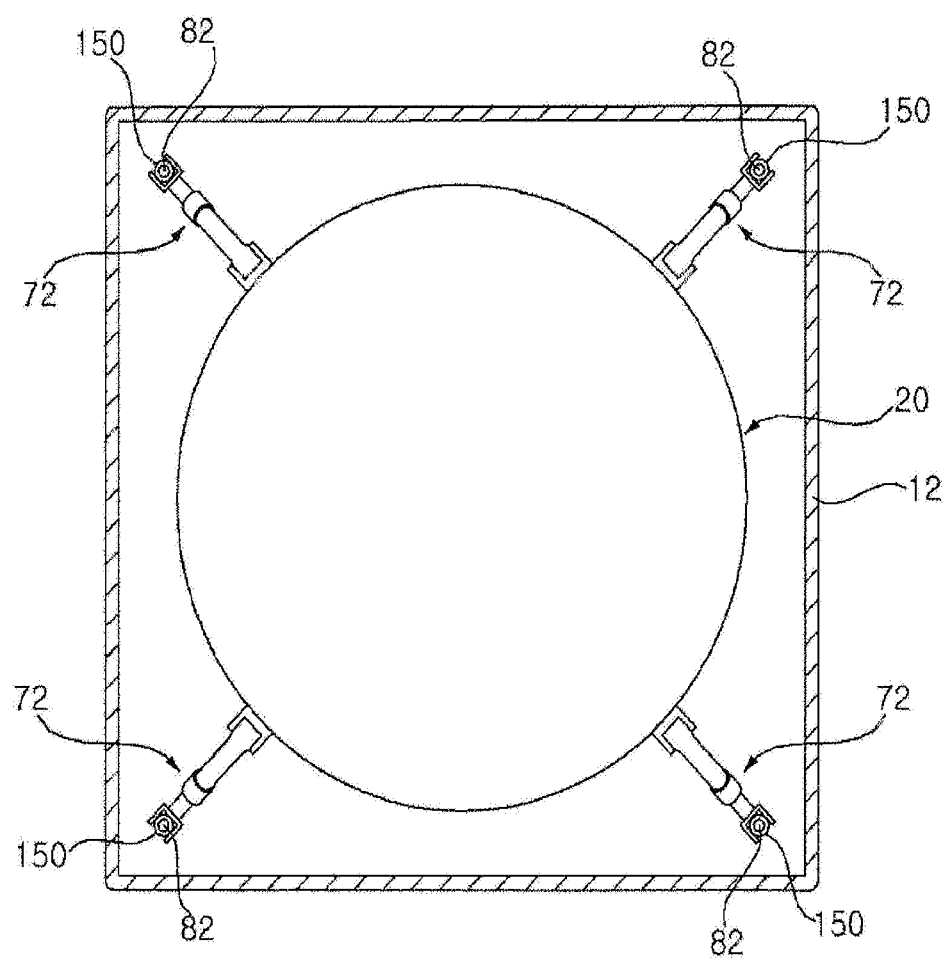
FIG. 6 is a plan view schematically illustrating arrangement of a transverse damper in a top load washing machine according to a first embodiment of the present invention.

FIG. 5 is a front view schematically illustrating arrangement of a transverse damper in a top load washing machine according to a first embodiment of the present invention, and FIG. 6 is a plan view schematically illustrating arrangement of a transverse damper in a top load washing machine according to a first embodiment of the present invention.

The transverse dampers 70 may be installed at a upper part and a lower part based on the slider 62, the supporting end 65, or the damper spring 63. Hereinafter, in embodiments, the upper part or the lower part are distinguished from each other based on the supporting end 65.

When viewed from the top, an inner side of the transverse damper 70 is coupled with the tub and an outer side thereof is coupled with the guide pin 80.

The guide pin 80 vertically extends long.

The transverse damper 70 is coupled with the guide pin 80 to cross each other.

A damper holder 150 is disposed between the transverse damper 70 and the guide pin 80.

When vibration occurs in the tub 20, the transverse damper 70 may be vertically moved along the guide pin 80. More accurately, the first connection member 90 coupled with the damper holder 150 may be vertically moved along the guide pin 80 together with the damper holder 150.

Moreover, when vibration occurs in the tub 20, the first connection member 90 and the second connection member 100 move relative to each other to damp the transverse vibration of t the tub 20. (hereinafter, to damp vibration by the transverse damper is defined as a transverse damping)

The transverse damping may be operated in a state that the transverse damper 70 is fixed to the guide pin 80. The transverse damping may be operated when the transverse damper 70 is moved along the guide pin 80.

When a height of the transverse damper 70 is changed, the damper holder 150 is rotated based on the holder shaft 152 to prevent the guide pin 80 or the transverse damper 70 from being deformed.

In addition, an upper transverse damper 71 may be located above a middle height M of the tub 20, and a lower transverse damper 72 may be located under the middle height M of the tub 20.

When viewed from the top, four upper transverse dampers 71 are disposed around the tub 20 and are disposed at the same interval based on an axis of the tub 20.

Further, four lower transverse dampers 72 are disposed around the tub 20 and are disposed at the same interval based on an axis of the tub 20.

Moreover, in the present embodiment, when viewed from the top, an outer side of the transverse damper 70 is located at an edge of the cabinet 10 and an inner side of the transverse damper 70 is located at a peripheral surface of the tub 20.

Thus, when viewed from the top, a pair of two transverse dampers 70 is located at a straight line.

That is, four upper transverse dampers 71 are disposed toward a drive shaft of the tub 20.

In the present embodiment, the transverse damper 70 is radially disposed at a peripheral surface of the tub 20. The transverse damper 70 is installed perpendicular to a peripheral surface of the tub 20.

In the present embodiment, the shaft center corresponds to the drive shaft.

When viewed from the front, the upper transverse damper 71 and the lower transverse damper 72 are disposed horizontal to the ground.

Figure 7:
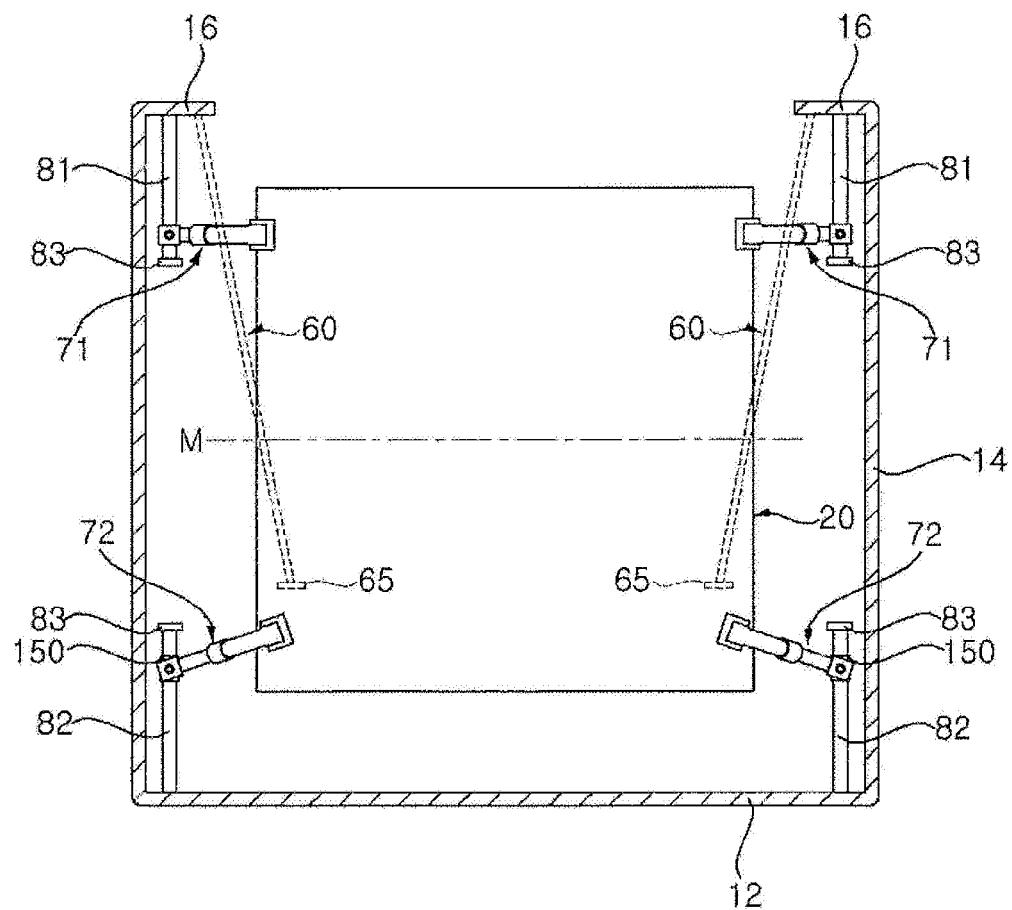
FIG. 7 is a front view schematically illustrating arrangement of a transverse damper in a top load washing machine according to a second embodiment of the present invention.

FIG. 7 is a front view schematically illustrating arrangement of a transverse damper in a top load washing machine according to a second embodiment of the present invention.

A top load washing machine according to the present embodiment is characterized in that a lower transverse damper 72 is inclined.

In the present embodiment, an upper transverse damper 71 is arranged at an upper part of an supporting end 65

An outer end of the lower transverse damper 72 is coupled with a lower guide pin 82 through a damper holder 150.

In the present embodiment, an outer end of the lower transverse damper 72 is located lower than an inner end thereof.

In the present embodiment, the outer end of the lower transverse damper 72 may be located higher than the inner end thereof.

When the outer end of the lower transverse damper 72 is located higher than the inner end thereof, the lower transverse damper 72 is installed more horizontally than an installation angle of the longitudinal damper 60.

Since the damper holder 150 may be rotated based on the holder shaft 152, the lower transverse damper may be coupled to be inclined at the lower guide pin 82.

The inclined lower transverse damper 72 may minimize a vertical motion of the tub 20.

When viewed from the front, the lower transverse damper 72 may be symmetrically disposed based on a drive shaft.

Further, when viewed from the front, the longitudinal damper 60 and the lower transverse damper 72 may form an obtuse angle.

Hereinafter, remaining constituent elements are the same as those of the first embodiment, and the detailed description thereof will be omitted.

Figure 8:
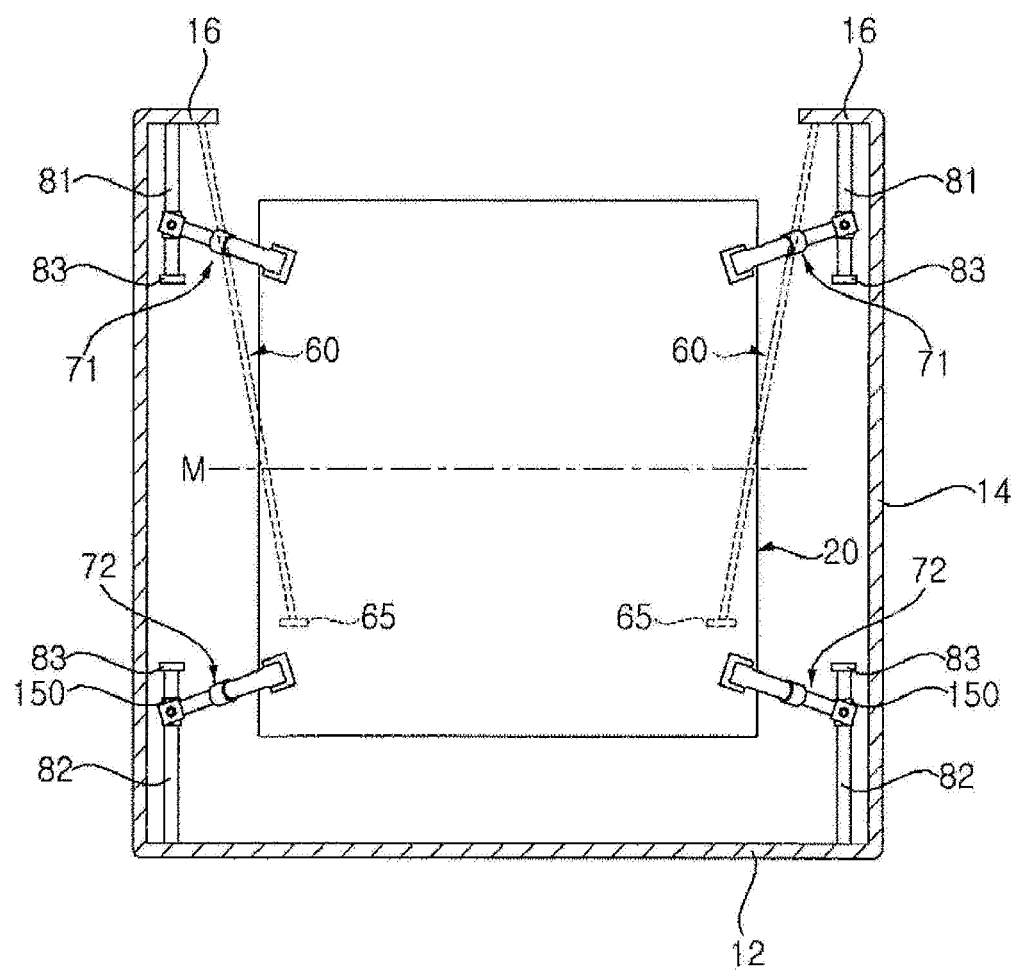
FIG. 8 is a front view schematically illustrating arrangement of a transverse damper in a top load washing machine according to a third embodiment of the present invention.

FIG. 8 is a front view schematically illustrating arrangement of a transverse damper in a top load washing machine according to a third embodiment of the present invention.

Unlike the second embodiment, a top load washing machine according to the present embodiment is characterized in that both of an upper transverse damper 71 and a lower transverse damper 72 are inclined.

In the present embodiment, the upper transverse damper 71 is located at an upper part of a supporting end 65, and the lower transverse damper 72 is located at a lower part of the supporting end 65.

Meanwhile, unlike the present embodiment, an outer end of the upper transverse damper 71 may be located lower than an inner end thereof.

In addition, an outer end of the lower transverse damper 72 may be located higher than an inner end thereof.

A height of the outer end or the inner end may be variously changed according to vibration occurring from the tub 20.

Hereinafter, remaining constituent elements are the same as those of the second embodiment, and the detailed description thereof will be omitted.

Figure 9:
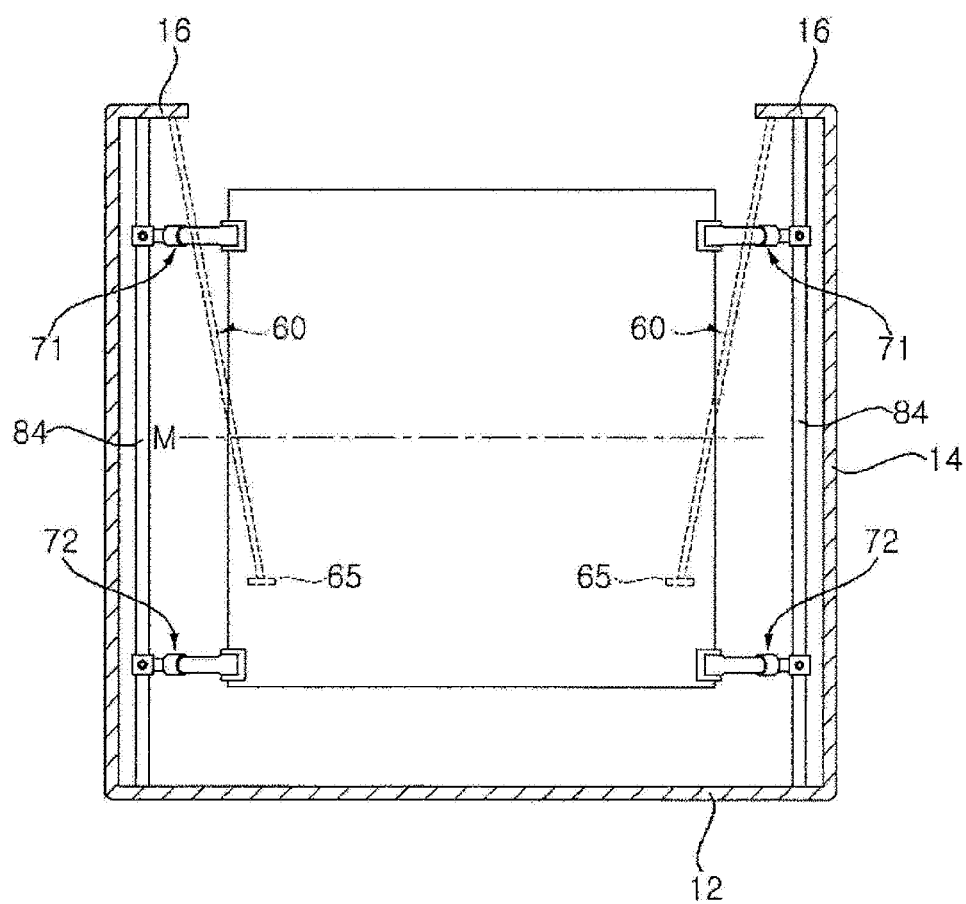
FIG. 9 is a front view schematically illustrating arrangement of a transverse damper in a top load washing machine according to a fourth embodiment of the present invention.

FIG. 9 is a front view schematically illustrating arrangement of a transverse damper in a top load washing machine according to a fourth embodiment of the present invention.

The transverse dampers 70 according to the present embodiment are installed at one guide pin including a top end fixed to the top cover 16 and a bottom end fixed to the cabinet base 12.

At least two transverse dampers 70 are vertically arranged at one guide pin 84.

The guide pin 84 supports the top cover 16 and the cabinet base 12.

An upper transverse damper 71 and a lower transverse damper 72 are installed at one guide pin 84.

The upper transverse damper 71 is located at an upper part of the supporting end 65 and the lower transverse damper 72 is located at a lower part of the supporting end 65.

When the vibration occurs in the tub 20, the upper transverse damper 71 or the lower transverse damper 72 may be vertically moved along the guide pin 84.

A guide pin 84 according to the present embodiment may firmly support load or vibration.

The guide pins 84 may be installed at four edges of the cabinet 10, respectively.

Hereinafter, remaining constituent elements are the same as those of the first embodiment, and the detailed description thereof will be omitted.

Figure 10:
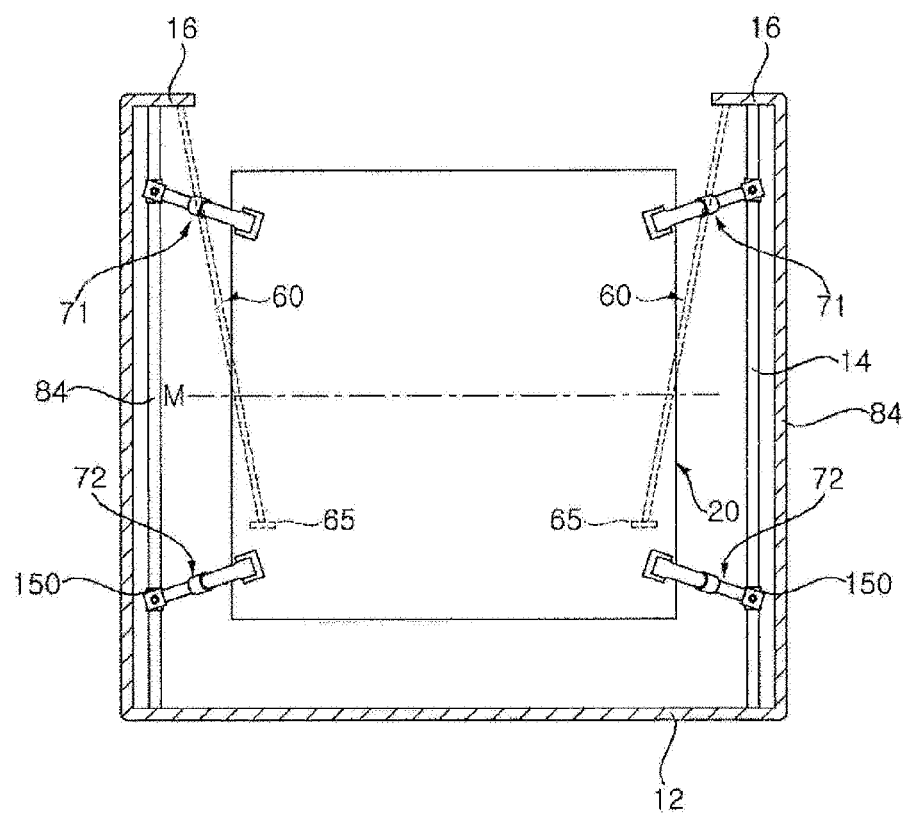
FIG. 10 is a front view schematically illustrating arrangement of a transverse damper in a top load washing machine according to a fifth embodiment of the present invention.

FIG. 10 is a front view schematically illustrating arrangement of a transverse damper in a top load washing machine according to a fifth embodiment of the present invention.

The present embodiment is characterizes in that one guide pin 84 is installed and the transverse damper 70 is inclined.

That is, the present embodiment is a combination structure of an installation structure of the transverse damper 70 illustrated in the third embodiment and a guide pin 84 illustrated in the fourth embodiment.

The present embodiment has effects that the transverse damper 70 may strongly suppress vibration of the tub 20 and the guide pin 84 may firmly support the transverse dampers 70.

Hereinafter, remaining constituent elements are the same as those of the third or fourth embodiment, and the detailed description thereof will be omitted.

Figure 11:
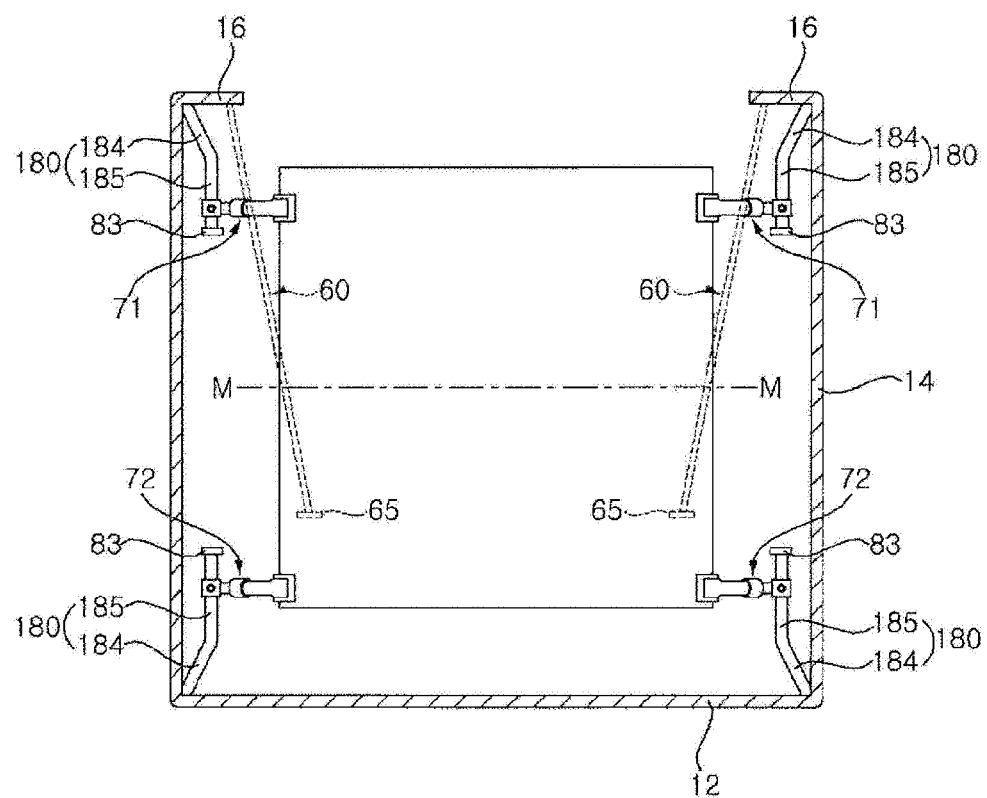
FIG. 11 is a front view schematically illustrating arrangement of a transverse damper in a top load washing machine according to a sixth embodiment of the present invention.

FIG. 11 is a front view schematically illustrating arrangement of a transverse damper in a top load washing machine according to a sixth embodiment of the present invention.

A guide pin 180 according to the present embodiment includes an oblique support part 184 coupled with a cabinet 10 and a guide part 185 coupled with the transverse damper 70 to vertically guide the transverse damper 70.

The oblique support part 184 is fixed to the cabinet 10.

The oblique support part 184 may be fixed to the top cover 16.

The oblique support part 184 may be fixed to the cabinet body 14.

The oblique support part 184 may be fixed to the cabinet base 12.

The oblique support part 184 may be fixed to both of the top cover 16 and the cabinet body 14.

The oblique support part 184 may be fixed to both of the cabinet base 12 and the cabinet body 14.

The oblique support part 184 is bent toward an outer side of the tub 20.

When the horizontal vibration occurs in the tub 20, the oblique support part 184 may efficient support the above.

In the present embodiment, the upper transverse damper 71 is located at an upper part of the support end 65 and the lower transverse damper 72 is located at a lower part of the support end 65.

Hereinafter, remaining constituent elements are the same as those of the first embodiment, and the detailed description thereof will be omitted.

Figure 12:
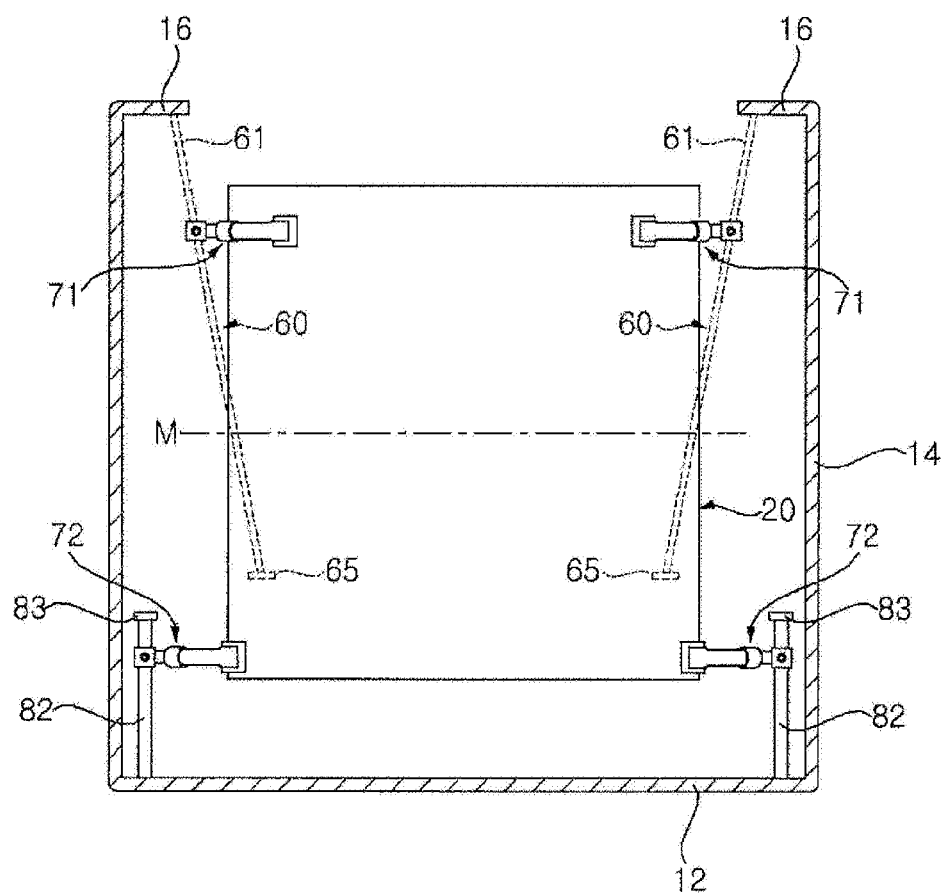
FIG. 12 is a front view schematically illustrating arrangement of a transverse damper in a top load washing machine according to a seventh embodiment of the present invention.

FIG. 12 is a front view schematically illustrating arrangement of a transverse damper in a top load washing machine according to a seventh embodiment of the present invention.

The present embodiment is characterized in that the upper transverse damper 71 is coupled with the longitudinal damper 60.

The upper transverse damper 71 is coupled with a support rod 61.

The support rod 61 is assembled through the damper holder 150.

An outer end of the upper transverse damper 71 is coupled with the longitudinal damper 60 and an inner end thereof is coupled with an outer peripheral surface of the tub 20.

When the vibration occurs in the tub 20, the support rod 61 supports the upper transverse damper 71 to buffer the vibration.

The upper transverse damper 71 may be vertically moved along the support rod 61.

The lower transverse damper 72 is assembled with a lower guide pin 82 and the tub 20 as in the first embodiment.

Hereinafter, remaining constituent elements are the same as those of the first embodiment, and the detailed description thereof will be omitted.

Figure 13:
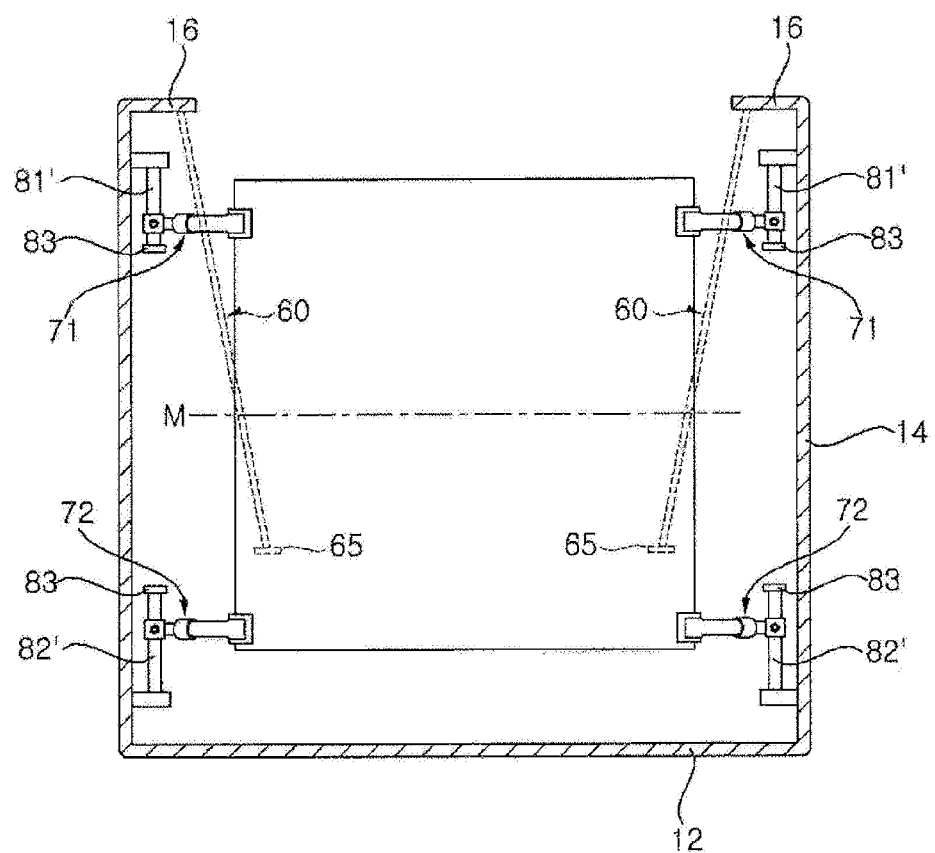
FIG. 13 is a front view illustrating an inside of a cabinet in a washing machine according to an eighth embodiment of the present invention.

FIG. 13 is a front view illustrating an inside of a cabinet in a washing machine according to an eighth embodiment of the present invention.

A top load washing machine according to the present embodiment is characterized in that guide pins 81' and 82' are fixed to a cabinet body 14.

The upper guide pin 81' is installed downward from the cabinet body 14, and the lower guide pin 82' is installed upward from the cabinet body 14.

Unlike the present embodiment, both ends of the guide pins 81' and 82' may be installed downward or upward.

In the present embodiment, strength of the cabinet body 14 is high or a support force of the cabinet body 14 with respect to a load is structurally high.

In this case, the cabinet body 14 may be installed in the top cover 16 or the cabinet base 12 instead of a guide pin.

In the present embodiment, the upper transverse damper 71 is located at an upper part of the supporting end 65 and the lower transverse damper 72 is located at a lower part of the supporting end 65.

Hereinafter, remaining constituent elements are the same as those of the first embodiment, and the detailed description thereof will be omitted.

Figure 14:
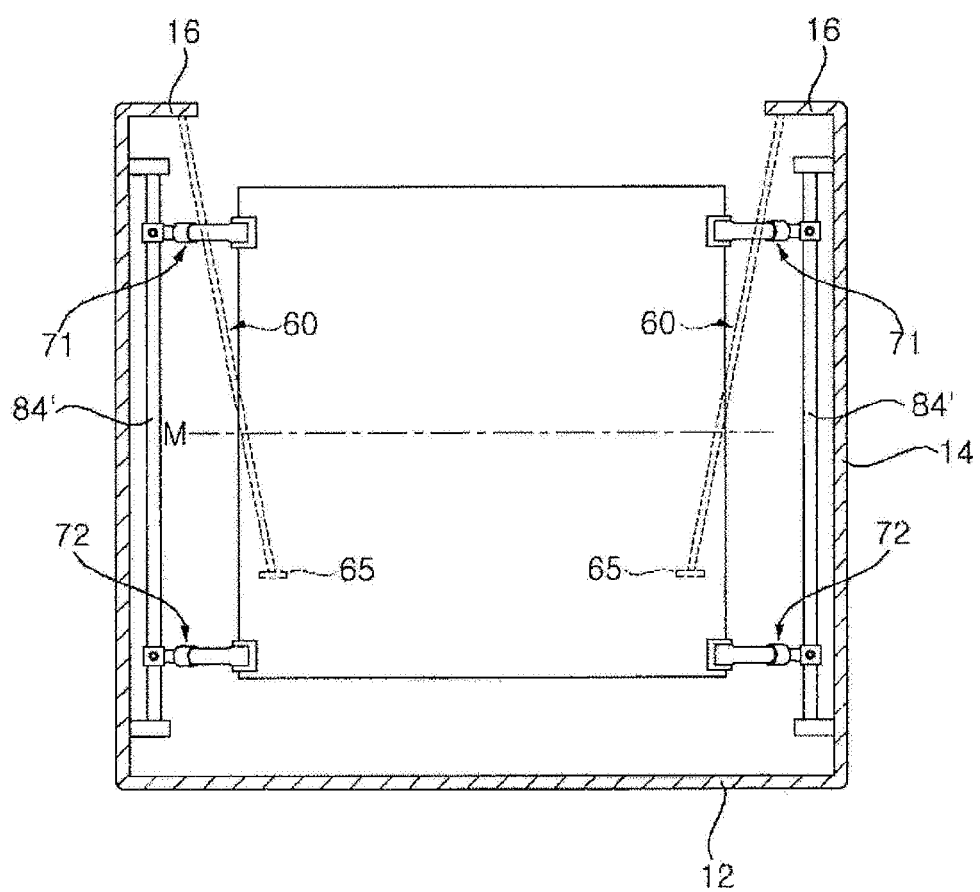
FIG. 14 is a plan view schematically illustrating a transverse damper in a top load washing machine according to a ninth embodiment of the present invention.

FIG. 14 is a plan view schematically illustrating a transverse damper in a top load washing machine according to a ninth embodiment of the present invention.

Unlike the fifth embodiment, according to the top load washing machine according to the present embodiment, a guide pin 84' is fixed to a cabinet body 14.

An upper transverse damper 71 and a lower transverse damper 72 are coupled with the one guide pin 84'.

Hereinafter, remaining constituent elements are the same as those of the fifth embodiment, and the detailed description thereof will be omitted.

Figure 15:
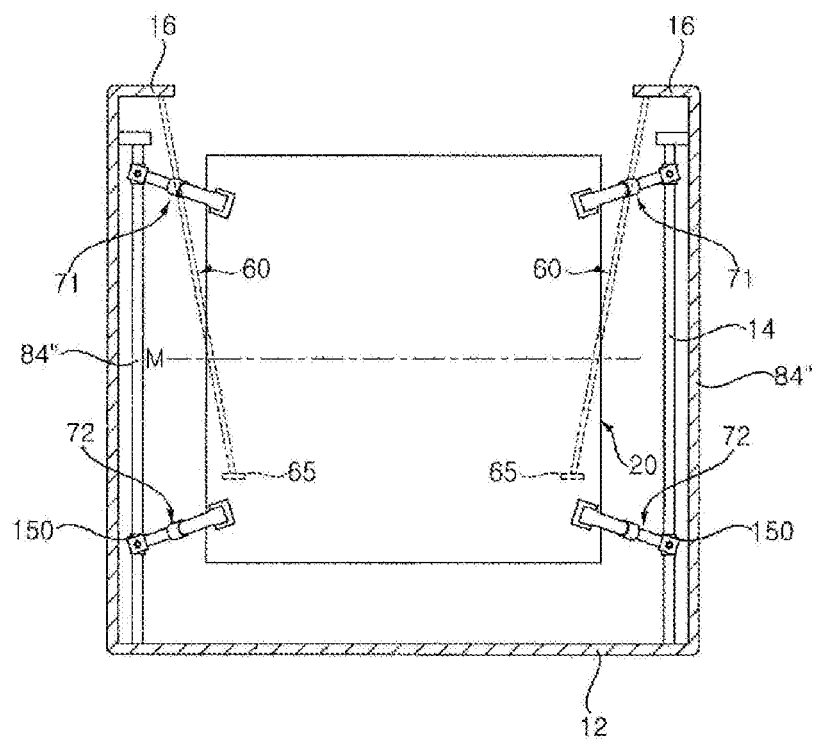
FIG. 15 is a plan view schematically illustrating arrangement of a transverse damper in a top load washing machine according to a tenth embodiment of the present invention.

FIG. 15 is a plan view schematically illustrating arrangement of a transverse damper in a top load washing machine according to a tenth embodiment of the present invention.

Unlike the fifth embodiment, in the top load washing machine according to the present embodiment, a guide pin 84" is fixed to a cabinet body 14 and a cabinet base 12.

An upper transverse damper 71 and a lower transverse damper 72 are coupled with the one guide pin 84".

Hereinafter, remaining constituent elements are the same as those of the fifth embodiment, and the detailed description thereof will be omitted.

Figure 16:
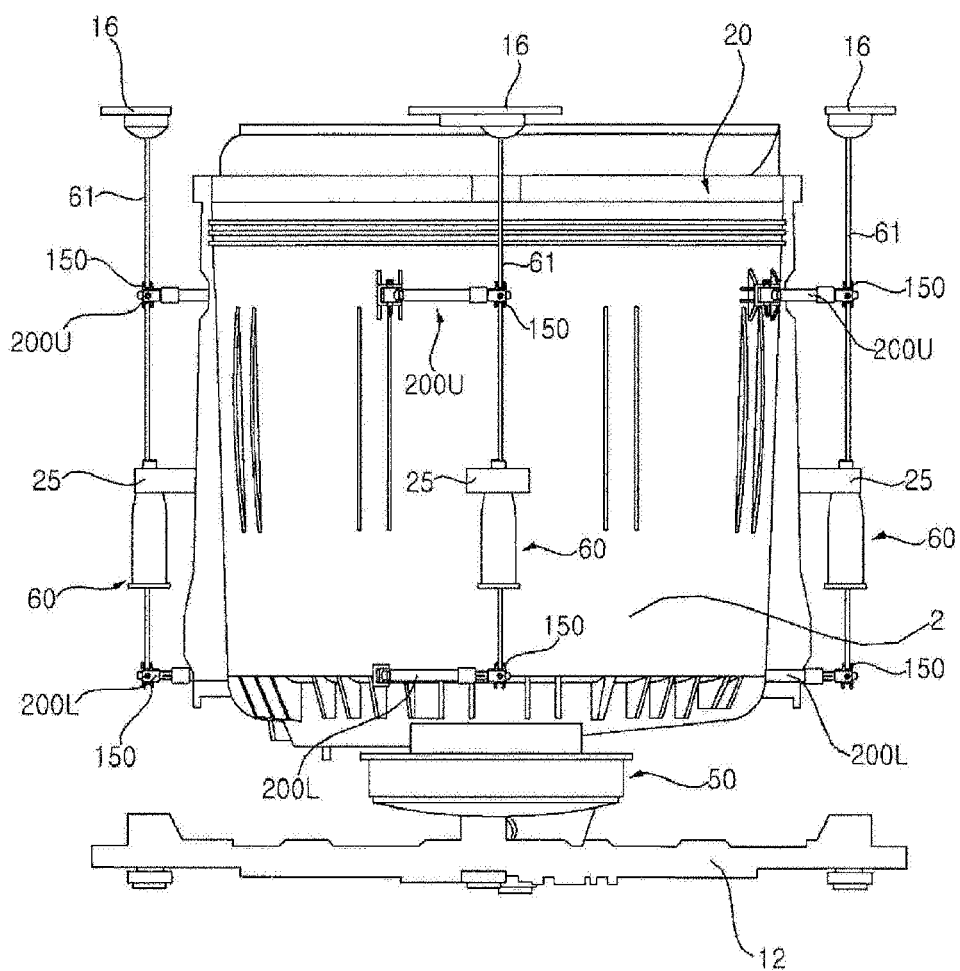
FIG. 16 shows an interior of a cashing of a washing machine according to an eleventh embodiment of the present invention.

A washing machine according to an eleventh embodiment of the present invention will be described with reference to FIG. 16 and FIG. 17.

Unlike the first embodiment, a transverse damper according to the present embodiment connects a tub 20 to a longitudinal damper 60.

The transverse dampers according to the first embodiment are connected to the guide pin 80 fixed to the cabinet 10. Meanwhile, transverse dampers 200U and 200L according to the present embodiment are connected to an upper part and a lower part of the longitudinal damper 60, respectively.

A support rod 61 of the longitudinal damper 60 extends downward through the supporting end 65. A slider 62 of the longitudinal damper 60 is coupled with a mount 25. The longitudinal damper 60 is fixed to the mount 25, and is moved together with a tub 20.

A damper disposed at an upper part based on the slider 62 or the supporting end 65 is defined as an upper transverse damper 200U, and a damper disposed at a lower part based on the slider 62 or the supporting end 65 is defined as a lower transverse damper 200L.

Although not shown in drawings, a friction part 64 may be further disposed at the support rod 61.

A damper holder 150 is disposed between the upper transverse damper 200L and the support rod 61. The support rod 61 is formed through the damper holder 150. The damper holder 150 may be moved along the support rod 61.

The upper transverse damper 200U may be rotated based on a holder shaft 152 of the damper holder 150.

A connection structure between the lower transverse damper 200L and the support rod 61 is the same as that of the upper transverse damper 200U.

Figure 17:
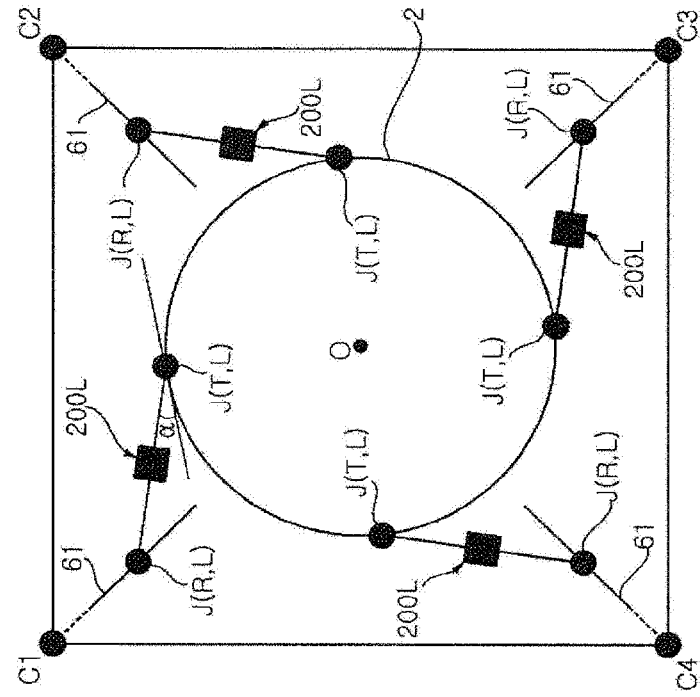
FIGS. 17(a) and 17(b) are pattern diagrams illustrating an arrangement configuration of an upper horizontal vibration damper and a lower horizontal vibration damper in a washing machine of FIG. 16, respectively.
Figure 17:
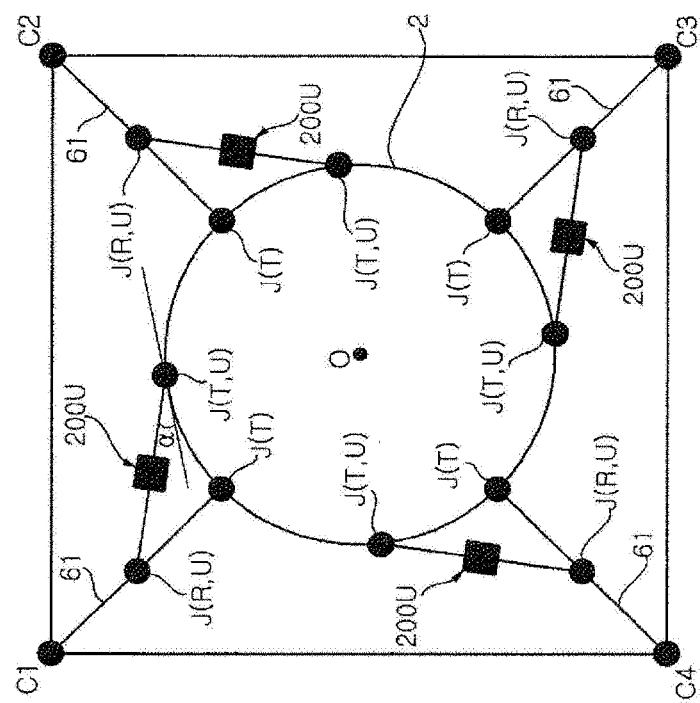

A reference numeral J(R, U) of FIG. 17 represents a connection part of the upper transverse damper 200U with the support rod 61. A reference numeral J(R, U) represents a connection part of the lower transverse damper 200L with the support rod 61. The J(R, U) is located at an upper part as compared with the J(R, L) on the support rod 61.

A reference numeral J(T, U) represents a connection part of the upper transverse damper 200U with the tub 20. A reference numeral J(T, L) represents a connection part of the lower transverse damper 200L with the tub 20. The J(T, U) is located at an upper part as compared with the J(T, L).

A rotation tendency of a lower portion of the tub 20 with respect to J(T) is attenuated by the lower transverse damper 200L, and a rotation tendency of an upper portion of the tub 20 with respect to J(T) is attenuated by the upper transverse damper 200U.

In a case of the lower transverse damper 200L, a line of connecting a part J(R, L) connected with the support rod 61 to a part J(T, L) connected with the tub 20 may form an acute angle α with an outer surface of the tub 20. (see FIG. 17)

In a case of the upper transverse damper 200U, a line of connecting a part J(R, U) connected with the support rod 61 to a part J(T, U) connected with the tub 20 may form an acute angle α with an outer surface of the tub 20. (see FIG. 17)

Figure 18:
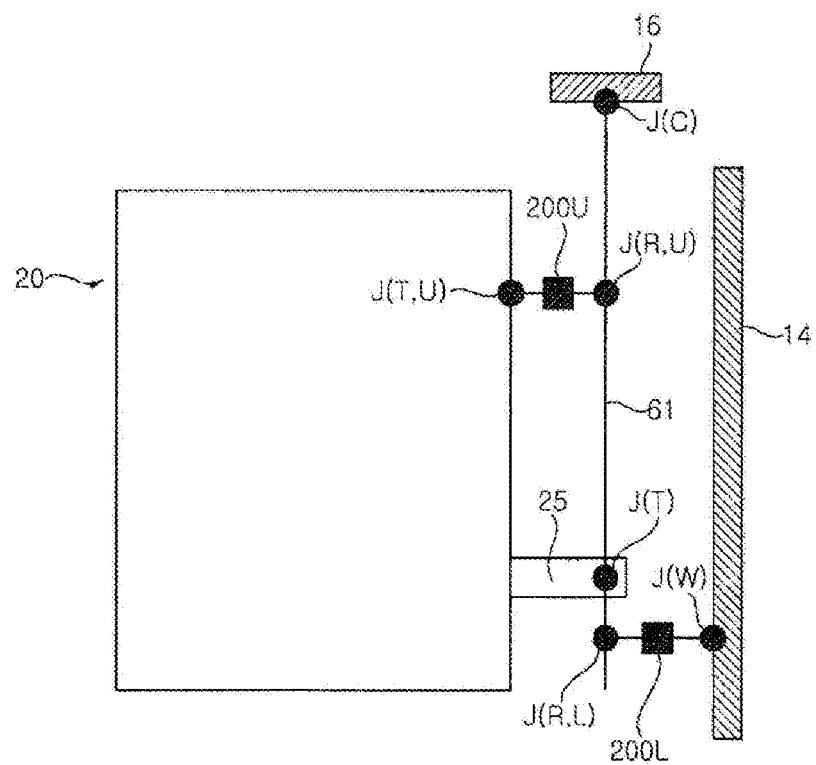
FIG. 18 is a pattern diagram illustrating an installation configuration of the lower horizontal vibration damper in a washing machine according to a twelfth embodiment of the present invention.

FIG. 18 is a pattern diagram illustrating an installation configuration of the lower horizontal vibration damper 200U in a washing machine according to a twelfth embodiment of the present invention. Referring to FIG. 18, the lower transverse damper 200L may connect the support rod with a cabinet body 14 of the cabinet 12.

In detail, the second connection member 100 may be connected with the cabinet body 14. A second connector 122 may be connected with the cabinet body 14 to allow transverse axis rotation, and may be further connected to allow longitudinal axis rotation. A separate configuration connected with the cabinet body 14 to allow longitudinal axis rotation (rotation based on a vertical axis) and/or transverse axis rotation (rotation based on a horizontal axis) may be further included.

A reference numeral J(R, U) represents a connection part of a first connection member 90 of the upper transverse damper 200U with the support rod 61. A reference numeral J(T, U) represents a connection part of a second connection member 120 of the upper transverse damper 200U with the tub 20.

A reference numeral J(C) represents a connection part of the support rod 61 with corners C1, C2, C3, and C4. A reference numeral J(T) represents a connection part of the buffer device 30' with the tub 20.

A reference numeral J(R, U) represents a connection part of the lower transverse damper 200U with the support rod 61. A reference numeral J(W) represents a connection part of the lower transverse damper 200L with the cabinet body 14. It is preferred that the J(W) is located lower than the J(T).

Hereinafter, remaining constituent elements are the same as those of the eleventh embodiment, and the detailed description thereof will be omitted.

Figure 19:
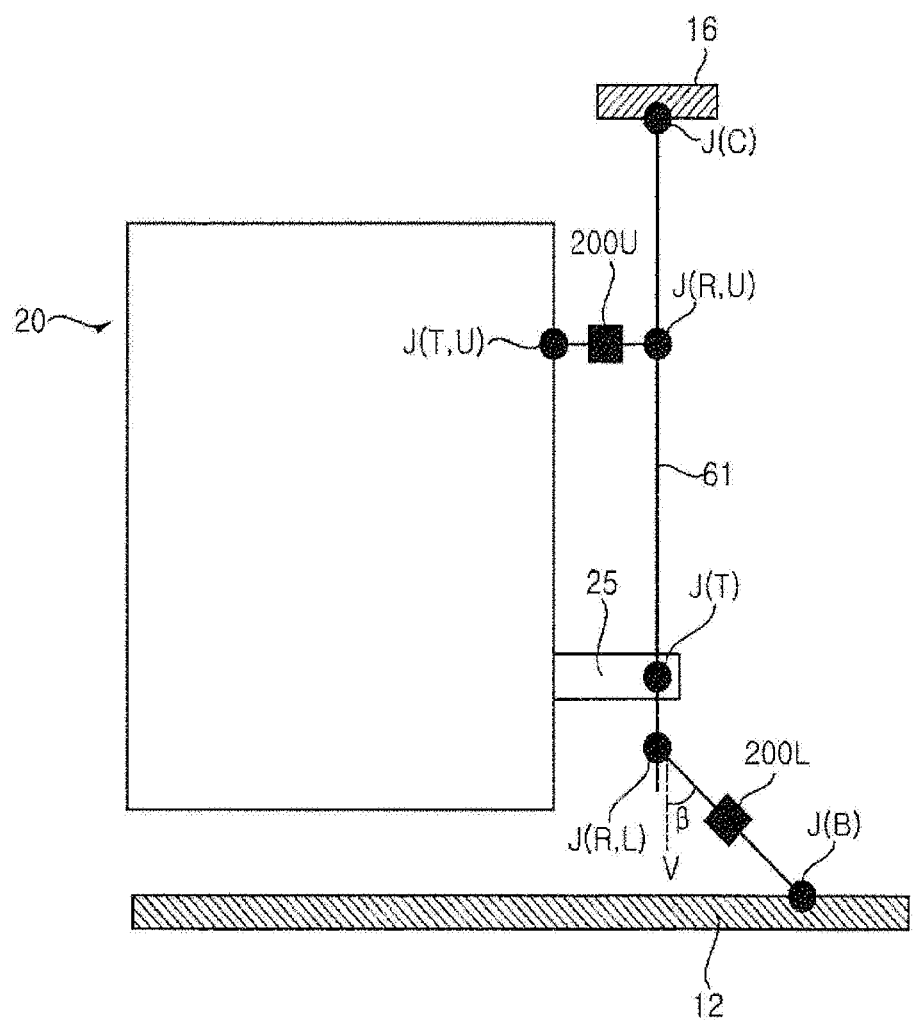
FIG. 19 is a pattern diagram illustrating an installation configuration of the lower horizontal vibration damper in a washing machine according to a thirteenth embodiment of the present invention.

FIG. 19 is a pattern diagram illustrating an installation configuration of the lower horizontal vibration damper 200L in a washing machine according to a thirteenth embodiment of the present invention. Referring to FIG. 19, the transverse damper 200L may connect the support rod 61 to a base 12.

In detail, the second connection member 120 may be connected with the base 12. The second connector 122 may be connected with the base 122 to allow the transverse axis rotation.

A connection part J(B) of the second connection member 120 with the base 12 is disposed at an outer side as compared with the tub 20 in a radial direction from a center O (see FIG. 17) of the tub 20. It is preferred that the J(B) is located at an outer side as compared with the J(C).

Furthermore, a line to connect the J(R, L) to the J(B) may form a predetermined acute angle β with a vertical line V when viewed from the lateral side as shown in FIG. 19.

The second connection member 120 may be rotatably coupled with the base 12. Such coupling may allow transverse axis rotation of the second connection member 120 and further allow longitudinal axis rotation.

Hereinafter, remaining constituent elements are the same as those of the eleventh embodiment, and the detailed description thereof will be omitted.

Figure 20:
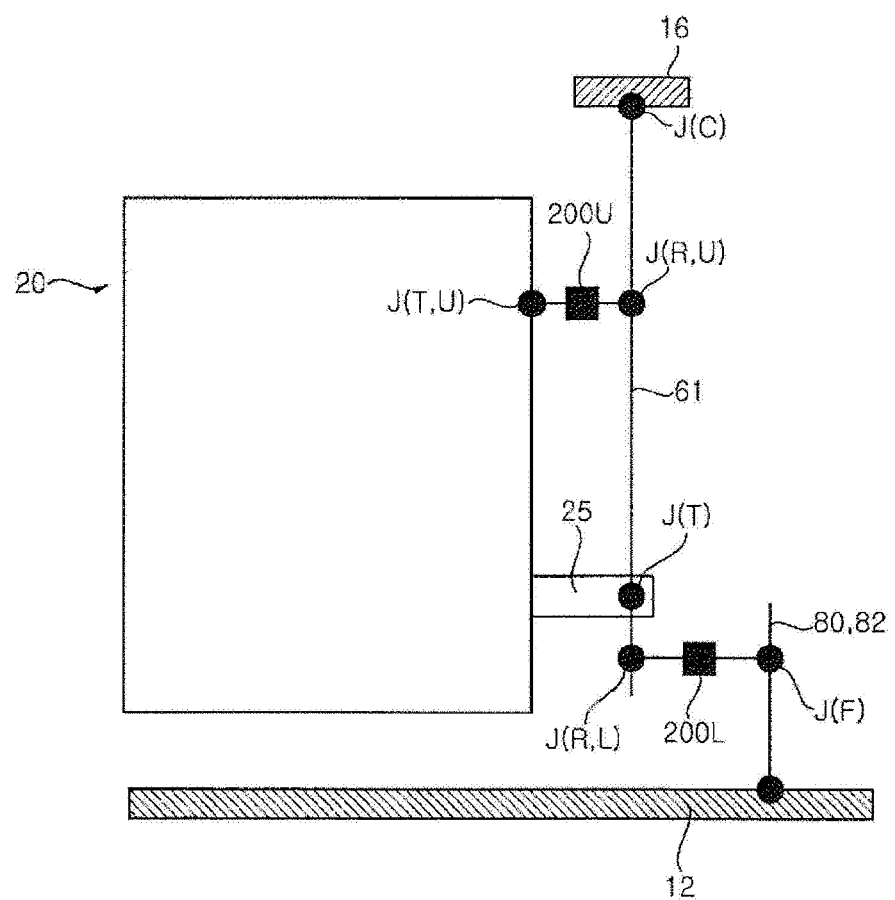
FIG. 20 is a pattern diagram illustrating an installation configuration of the lower horizontal vibration damper in a washing machine according to a fourteenth embodiment of the present invention.

FIG. 20 is a pattern diagram illustrating an installation configuration of the lower horizontal vibration damper 200L in a washing machine according to a fourteenth embodiment of the present invention.

Referring to FIG. 20, a lower transverse damper 200L may connect the support rod 61 to the guide pin 80. The guide pins 80 and 82 may be supported by the base 12.

In detail, the second connection member 120 may be movably provided along a guide pin 82 which vertically extends. A reference numeral J(F) represents a connection part of the second connection member 120 with the guide pin 82.

The guide pin 82 is disposed at an upper part as compared with the tub 20 along a radial direction from a center O (see FIG. 17) of the tub 20. It is preferred that the J(F) is disposed at an upper part as compared with the J(C). Further, it is preferred that the J(F) is disposed at an lower part as compared with the J(C).

The coupling of the second connection member 120 with the guide pin 82 allows a transverse axis rotation of the second connection member 120 and further allows the longitudinal axis Hereinafter, remaining constituent elements are the same as those of the first and eleventh embodiments, and the detailed description thereof will be omitted.

Although embodiments of the present invention have been described with reference to a number of illustrative embodiments thereof, it should be understood that numerous other modifications and embodiments can be devised by those skilled in the art that will fall within the spirit and scope of the principles of this disclosure. A detailed description of the accompanying drawings and the invention are only an embodiment of the present invention, which are used for the purpose of describing the present invention but are not used to limit the meanings or a range of the present invention described in claims.

The invention claimed is:

1. A laundry processing apparatus comprising:
   a cabinet;
   a tub, arranged in the interior of the cabinet, for storing laundry water;
   longitudinal dampers connecting the cabinet and tub and supported on supporting ends on the tub, and supporting the tub as same hangs from the cabinet;
   upper guide pins fixed to the upper parts of the cabinet and extending vertically with respect to the supporting ends;
   upper transverse dampers, connecting the upper guide pins and tub and vertically movable along the upper guide pins, for reducing the horizontal vibration for the tub;
   lower guide pins fixed to the lower parts of the cabinet and extending vertically with respect to the supporting ends;
   lower transverse dampers, connecting the lower guide pins and tub and vertically movable along the lower guide pins, for reducing the horizontal vibration for the tub;
   an upper guide pin fixed to an upper part of the cabinet based on the supporting end and vertically extending long; and
   a lower guide pin fixed to a lower part of the cabinet based on the supporting end and vertically extending long,
   wherein an upper transverse damper connects the upper guide pin and the tub, is vertically moved along the upper guide pin, and
   wherein a lower transverse damper connects the lower guide pin and the tub, is vertically moved along the lower guide pin.

2. The laundry processing apparatus of claim 1, wherein a plurality of the upper transverse dampers are disposed at a same interval when viewed from a top of the tub.

3. The laundry processing apparatus of claim 1, wherein a plurality of the lower transverse dampers are disposed at a same interval when viewed from a top of the tub.

4. The laundry processing apparatus of claim 1, wherein an outer end of at least one of the upper transverse damper or the lower transverse damper is located at an edge of the cabinet.

5. The laundry processing apparatus of claim 4, wherein an inner end of at least one of the upper transverse damper or the lower transverse damper is disposed perpendicular to an outer peripheral surface of the tub.

6. The laundry processing apparatus of claim 4, wherein an inner end of at least one of the upper transverse damper or the lower transverse damper is disposed to form an acute angle with an outer peripheral surface of the tub.

7. The laundry processing apparatus of claim 1, wherein at least one of the upper transverse damper or the lower transverse damper is installed horizontally to a ground.

8. The laundry processing apparatus of claim 1, wherein at least one of the upper transverse damper or the lower transverse damper is vertically inclined.

9. The laundry processing apparatus of claim 8, wherein an outer end of the inclined upper transverse damper is higher than an inner end of the inclined upper transverse damper.

10. The laundry processing apparatus of claim 8, wherein an outer end of the inclined upper transverse damper is lower than an inner end of the inclined upper transverse damper.

11. The laundry processing apparatus of claim 1, further comprising:
a damper holder installed at the upper transverse damper where the upper guide pin is formed through the damper holder,
wherein the damper holder is coupled with the upper transverse damper through a holder shaft, is rotated relative to the upper transverse damper based on the holder shaft, and is vertically and movably assembled along the upper guide pin.

12. The laundry processing apparatus of claim 1, further comprising:
a damper holder installed at the lower transverse damper where the lower guide pin is formed through the damper holder,
wherein the damper holder is coupled with the lower transverse damper through a holder shaft, is rotated relative to the lower transverse damper based on the holder shaft, and is vertically and movably assembled along the lower guide pin.

13. The laundry processing apparatus of claim 1, wherein at least one of the upper guide pin or the lower guide pin comprises:
an oblique support part coupled with the cabinet; and
a guide part coupled with the upper transverse damper or the lower transverse damper, and to vertically guide the upper transverse damper or the lower transverse damper.

14. The laundry processing apparatus of claim 1, wherein the cabinet comprises:
a cabinet base placed on a ground;
a cabinet body coupled with an edge of the cabinet case to form a lateral surface; and
a top cover coupled with an upper part of the cabinet body and including an upper part formed therein with an introduction hole so that laundry is vertically introduced,
wherein the upper guide pin is fixed to the top cover, and the lower guide pin is fixed to the cabinet base.

15. The laundry processing apparatus of claim 1, wherein the cabinet comprises:
cabinet base placed on a ground;
a cabinet body coupled with an edge of the cabinet case to form a lateral surface; and
a top cover coupled with an upper part of the cabinet body and including an upper part formed therein with an introduction hole so that laundry is vertically introduced,
the upper guide pin is fixed to the cabinet body, and the lower guide pin is fixed to the cabinet base.

16. The laundry processing apparatus of claim 1, wherein the cabinet comprises:
a cabinet base placed on a ground;
a cabinet body coupled with an edge of the cabinet case to form a lateral surface; and
a top cover coupled with an upper part of the cabinet body and including an upper part formed therein with an introduction hole so that laundry is vertically introduced,
wherein the upper guide pin and the lower guide pin are fixed to the cabinet body.

* * * * *